US012658736B2

(12) United States Patent
Reyes et al.

(10) Patent No.: US 12,658,736 B2
(45) Date of Patent: Jun. 16, 2026

(54) WIRELESS CHARGING WITH RECONFIGURABLE RF WAVEFORM

(71) Applicant: Renesas Design Austria GmbH, Graz (AT)

(72) Inventors: Jacob Reyes, Graz (AT); Francesco Antonetti, Graz (AT)

(73) Assignee: Renesas Design Austria GmbH, Graz (AT)

( * ) Notice: Subject to any disclaimer, the term of this patent is extended or adjusted under 35 U.S.C. 154(b) by 0 days.

(21) Appl. No.: 18/848,253

(22) PCT Filed: Mar. 10, 2023

(86) PCT No.: PCT/EP2023/056159
§ 371 (c)(1),
(2) Date: Sep. 18, 2024

(87) PCT Pub. No.: WO2023/194034
PCT Pub. Date: Oct. 12, 2023

(65) Prior Publication Data
US 2025/0112504 A1      Apr. 3, 2025

(30) Foreign Application Priority Data

Apr. 7, 2022      (EP) .................................... 22167055

(51) Int. Cl.
*H02J 50/20*          (2016.01)
*H02J 50/40*          (2016.01)
*H02J 50/80*          (2016.01)
(52) U.S. Cl.
CPC ............ *H02J 50/20* (2016.02); *H02J 50/402* (2020.01); *H02J 50/80* (2016.02)

(58) Field of Classification Search
CPC ........... H02J 50/20; H02J 50/402; H02J 50/80
See application file for complete search history.

(56) References Cited

U.S. PATENT DOCUMENTS

| | | | |
|---|---|---|---|
| 2014/0035521 A1 | 2/2014 | Endo | |
| 2014/0203655 A1* | 7/2014 | Kim ........................ | H02J 50/12 307/104 |

(Continued)

OTHER PUBLICATIONS

International Search Report and Written Opinion dated May 25, 2023 issued in PCT/EP2023/056159.

(Continued)

*Primary Examiner* — Daniel Cavallari
*Assistant Examiner* — Rasem Mourad
(74) *Attorney, Agent, or Firm* — SCULLY, SCOTT, MURPHY & PRESSER, P.C.

(57) ABSTRACT

A system including a power device and a portable device for wireless powering of a load of the portable device is provided. The power device includes a transmitter stage to generate a carrier signal and an antenna connected to the transmitter stage to emit a magnetic field with a first waveform of the carrier signal. The portable device includes an antenna exposed to the magnetic field of the power device to receive an antenna signal and a receiver stage connected to the antenna to rectify the antenna signal to provide power to the load of the portable device. The power device is built to emit the magnetic field with the first waveform of the carrier signal in a power transfer mode and to emit the magnetic field with a second waveform of the carrier signal in a communication mode.

5 Claims, 6 Drawing Sheets

(56)　　　　　　References Cited

U.S. PATENT DOCUMENTS

| | | | |
|---|---|---|---|
| 2014/0266031 A1* | 9/2014 | Sasaki | H01F 38/14 |
| | | | 320/108 |
| 2015/0087228 A1* | 3/2015 | Porat | H04B 5/266 |
| | | | 455/41.1 |
| 2016/0087452 A1 | 3/2016 | Aikawa et al. | |
| 2016/0119035 A1* | 4/2016 | Iida | G06K 7/10009 |
| | | | 455/41.1 |
| 2016/0149442 A1* | 5/2016 | Asanuma | G01V 3/10 |
| | | | 307/104 |
| 2018/0262049 A1* | 9/2018 | Ikefuji | H02J 50/12 |
| 2018/0367106 A1* | 12/2018 | Crols | H03F 3/195 |
| 2022/0344978 A1* | 10/2022 | Draak | H04B 5/72 |
| 2023/0084747 A1* | 3/2023 | Liu | H04B 5/22 |
| | | | 307/109 |

OTHER PUBLICATIONS

International Preliminary Report on Patentability dated Jan. 8, 2024
issued in PCT/EP2023/056159.

* cited by examiner

STATE OF THE ART

STATE OF THE ART

31

37

41

42

44

43

WIRELESS CHARGING WITH RECONFIGURABLE RF WAVEFORM

CROSS-REFERENCE TO RELATED APPLICATIONS

This application is a National Stage Entry under 35 U.S.C. § 371 of PCT International Application No. PCT/EP2023/056159 filed on Mar. 10, 2023, which claims priority to European Patent Application No. 22167055.7 filed with the European Patent Office on Apr. 7, 2022, the entire contents of each of which are incorporated herein by reference for all purposes.

FIELD OF THE INVENTION

The present invention relates to a system that comprises a power device and a portable device for wireless powering of a load of the portable device, which power device comprises: a transmitter stage to generate a carrier signal and
an antenna connected to the transmitter stage to emit a magnetic field with a first
waveform of the carrier signal and
which portable device comprises:
an antenna exposed to the magnetic field of the power device to receive an antenna signal and
a receiver stage connected to the antenna to rectify the antenna signal to provide power to the load of the portable device.

BACKGROUND OF THE INVENTION

Wireless charging is used for all kind of different portable devices like a mobile phone or earphones. The portable device just has to be dropped close-by a power device that generates and emits a magnetic field via an antenna of the power device with the advantage, that no wire is needed to charge the portable device. In some of these systems, the power device just emits the magnetic field and some newer systems comprise a feedback loop from the portable device to the power device to regulate the power of the magnetic field.

FIG. 1 shows such a system of a power device 1 and a portable device 2 with a battery 3 as load, known to a person skilled in the art. Such a system is for instance described in the NFC Forum™ Technical Specification Version 1.0. The power device 1 is a reader called "poller" and comprises an antenna 4 that emits a magnetic field with the frequency of 13.56 MHz and a sin-waveform of the carrier signal. The portable device 2 is a tag called "listener" and comprises an antenna 5 exposed to the magnetic field emitted by the power device 1. A matching circuit 15 matches the impedance of the output pins of the antenna 5 to input pins of a rectifier 6 that uses a bridge rectifier to rectify the antenna signal and to provide a direct DC voltage. A charge stage 7 of the portable device 2 is used to charge the battery 3. Charge stage 7 comprises a charger IC 8 that needs a power voltage of 5V+/−10% and a DC/DC converter 9 is used to convert the direct DC voltage provided by rectifier 6 to an appropriate input voltage $U_I$ at an input pin 10 of charge stage 7.

Battery 3 is a Li-Ion battery that needs to be charged by charge stage 7 in different time periods with different charge currents $I_C$ and charge voltages. To achieve that, charge stage 7 comprises a serial ohmic resistance component 11 in the path between input pin 10 and battery 3 to generate a measuring voltage, which is measured by current measurement stage 12 to measure the charge current $I_C$ to charge the battery 3. Charge stage 7 furthermore comprises a digital control stage 13 that generates a power adjustment information 16 in case the input voltage $U_I$ at input pin 10 and/or the charge current $I_C$ to charge the battery 3 are too low or too high. Such power adjustment information 16 is provided by the digital control stage 13 to a Cless Communication stage 14, which complies to the NFC communication protocol to communicate the power adjustment information 16 to the power device 1. With this feedback loop from portable device 2 to power device 1, charge stage 7 can request more or less power in the magnetic field provided by the power device 1. This increase of decrease of power in the magnetic field is achieved by a higher or lower amplitude of the carrier signal of the magnetic field.

FIG. 2 shows a time diagram of the charge current Ic in three different time periods TA, TB and TC to load battery 3. FIG. 2 furthermore shows input voltage $U_I$ at input pin 10 of charge stage 7 and the actual battery voltage $U_{BAT}$ during the time periods TA, TB and TC to load battery 3. To actually load battery 3 only battery voltage $U_{BAT}$ multiplied with charge current Ic is used. This wireless from the power device 1 to the portable device 2 transferred power is in the range of up to 1 W as for instance specified by the NFC-Forum specification. This amount of energy is enough to e.g. charge the battery of earphones, but will not be enough to e.g. charge a mobile phone within a reasonable time frame. Furthermore there is a continuous interest to reduce the overall charging time to load the battery of the portable device.

US 2016/087452 A1 and US 2014/035521 A1 and US 2018/262049 A1 discloses further systems to use the magnetic field of a power device to wireless power a portable device to charge its battery.

SUMMARY OF THE INVENTION

It is an object of the invention to provide a system of a power device and a portable device for wireless powering of the load of the portable device, which enables the wireless transfer of more power within a shorter time frame.

This object is achieved in a system according to claim 1.

The power device of the claimed system is built to emit the magnetic field with the first waveform of the carrier signal in a power transfer mode and to emit the magnetic field with a second waveform of the carrier signal in a communication mode. In a preferred embodiment the second waveform used in the communication mode could be a sin-waveform to communicate power adjustment information or any further information between the power device and the portable device. Such communication could be based on a protocol defined in a NFC Forum Specification and/or a protocol and waveform that complies with the FCC part 15 requirements for products used in the US. The FCC has different requirements based on use cases, for wireless transfer applications part 18 needs to be fulfilled. The first waveform of the carrier signal used in the power transfer mode could be a waveform with higher energy or power content like a square-waveform. In general the energy or power content of a waveform is characterized by its area below the waveform. Therefore a sawtooth-waveform has less energy content than a sin-waveform, which has less energy content than a square-waveform. By using a magnetic field in the power transfer mode with higher energy content more energy or power is transferred from the power device to the portable device in a particular time frame. This means more energy may be harvested by the receiver stage of the portable device which reduces the overall charging time to load the battery of the portable device and which enables to load batteries with higher capacities within a reasonable time frame. All this is achieved without changing the amplitude of the carrier signal of the magnetic field. In a further preferred embodiment the waveform of the carrier signal and the amplitude of the carrier signal may be changed to even more increase or decrease the energy content of the magnetic field. Furthermore as the requirements on the devices are different based on which standard is tested, the modification of the waveform based on the application allows to optimize the system performance, while still being compliant to the regulations.

The transmitter stage to provide an antenna signal to the antenna of the power device to emit the magnetic field with different waveforms of the carrier signal may be realized in different ways. In one embodiment of the invention the transmitter stage comprises a driver stage that is realized by a power amplifier disclosed in EP 3 182 585 B1. This known power amplifier comprises a number of N/2 driver blocks connected to a first output pin and further N/2 driver blocks connected to a second output pin of the power amplifier. Each of these parallel arranged driver blocks comprises a level shifter and a buffer or inverter and a series capacitor which is loaded to a charge stage depending on the waveform of the signal to be output at the first and second output pin. These parallel capacities of all driver blocks are loaded with the particular charge stage with a clock frequency M-times the transmission frequency of the magnetic field used for wireless charging of the battery of the portable device. The sum of these charge stages is provided at the first and second output pin and realizes the output current of the power amplifier. The use of such a power amplifier as shape stage in the transmitter stage of the power device comprises the advantage that only the bit combination at the input pins of the driver blocks needs to be adjusted to switch between different waveforms provided at the output pins of the driver stage. It is therefore easy and very energy efficient to switch between waveforms like sin-, sawtooth or rectangular. Any other waveform is possible to realize, just by changing the bit combination at the input pins of the driver blocks.

In another embodiment of the invention the transmitter stage could comprise a driver stage and a multiple filter bank and that the driver stage is built to switch between the different filter banks, each with a different filter curve. A carrier signal generated by the driver stage with a fixed waveform like e.g. a sin-waveform would be used as input signal for the multiple filter bank and depending on filter bank selected by the driver stage, a deformation of the waveform would be realized to shape different waveforms for different modes of the power device and the portable device. In a preferred embodiment, the fixed sin-waveform of the carrier signal would be used as second waveform in the communication mode and a waveform generated by the use of one of the filter banks would be used as first waveform in the power transfer mode.

In a further embodiment of the invention the power device comprises two or more transmitter stages, which each comprise their own antenna and emit their own magnetic field. The system furthermore comprises two or more receiver stages, which each comprise their own antenna to harvest power from the magnetic field of the transmitter stage to which the antenna of the receiver stage is exposed to. Such a system in principle is known from US2014/0266031 A1, which discloses to use two transmitter stages and two receiver stages in a portable device. To use two or more parallel transmitter and/or receiver stages with the first waveform of the carrier signal, that is optimized for high power transfer, would be very beneficial for fast wireless transfer of power. In communication mode only one transmitter stage wireless coupled to one receiver stage to communicate data and information based on the magnetic field with the second waveform of the carrier signal, that is optimized to high quality data transfer and less power consumption of the power device, is very beneficial in addition.

In a further embodiment of the invention power adjustment information from the receiver stage or from more than one receiver stage to adjust the strength of the magnetic field emitted by the antenna of one transmitter stage or by antennas of more than one transmitter stage would make the efficiency of this inventive system even better.

In another preferred embodiment of the invention the power device and the portable device may be set into a further application mode and which transmitter stage in this further application mode is built to emit the magnetic field with a third waveform of the carrier signal, which is different to the first waveform and the second waveform of the carrier signal. This third waveform could for instance be the sawtooth waveform, which transfers less power or energy compared with the sin-waveform. This minimal power transfer might be used in an energy saving mode of the power device and the portable device to stay in contact for long time like weeks or months to exchange information like the battery charge status of the battery of the portable device with minimal power used by the power device. Further applications modes with further waveforms of the carrier signal of the magnetic field emitted by the power device to the portable device may be useful as well.

These and other aspects of the invention will be apparent from and elucidated with reference to the embodiments described hereinafter. The person skilled in the art will understand that various embodiments may be combined.

DETAILED DESCRIPTION OF EMBODIMENTS

Figure 3:
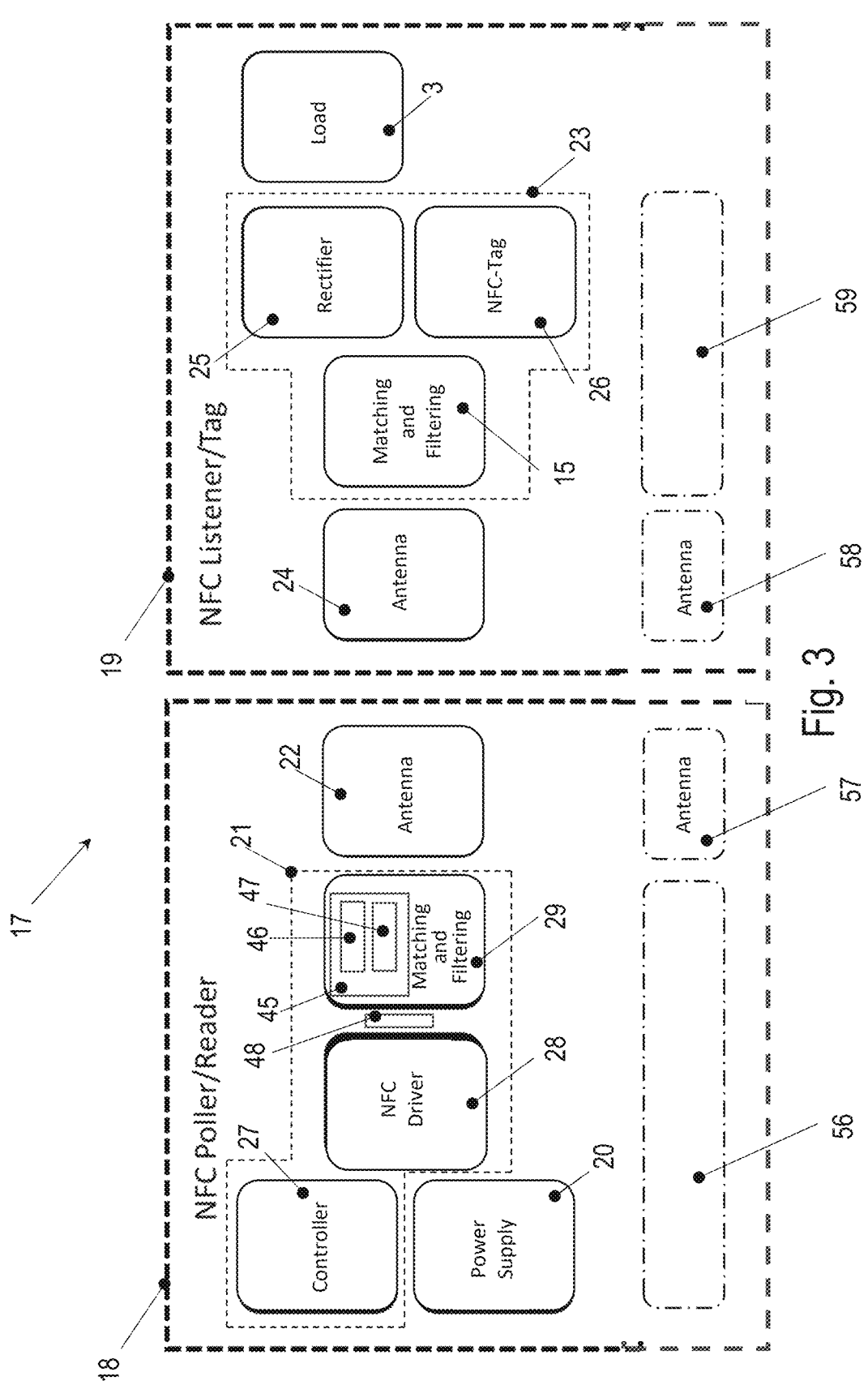
FIG. 3 shows a system according to the invention, which comprises a power device and a portable device with a load to be powered wireless.

FIG. 3 shows a first embodiment of the invention with a system 17 of a power device 18 and a portable device 19 for wireless charging of a battery 3 of the portable device 19. The power device 18 is supplied by mains supply voltage connected to a power supply stage 20, which is built to supply the further stages of the power device 18. The power device 18 furthermore comprises a transmitter stage 21 connected to an antenna 22, that emits a magnetic field based on a carrier signal with the frequency of 13.56 MHz and a particular waveform of the carrier signal provided by the transmitter stage 21 to the antenna 22. The carrier signal may be with modulation to transmit data in a communication mode or without modulation. The power device 18 furthermore comprises a receiver stage with or without demodulation, which receiver stage is not shown in FIG. 3, but may be used to receive data from the portable device 19.

The portable device 19 comprises a receiver stage 23 connected to an antenna 24, which is exposed to the magnetic field emitted by the antenna 22 of the power device 18. The wireless communication between the transmitter stage 21 and the receiver stage 23 is processed in a communication mode of the power device 18 and the portable device 19. In this embodiment of the invention the protocol and data exchanged during this communication mode complies with the standard ISO 18.092 known as Near Field Communication. Any other comparable standard could be used as well. In the embodiment of FIG. 3, the receiver stage 23 comprises the same basic structure of the technical elements as disclosed in FIG. 1, as it comprises the matching circuit 15 and a rectifier, DC/DC converter and charge stage as part of rectifier stage 23, which provides a charge current $I_C$ to the battery 3 to charge the battery 3 in the charging cycles of time periods TA, TB and TC. In other embodiments of the invention the receiver stage 23 could be realized as discrete solution that doesn't use a DC/DC converter and can handle input voltages lower than 4.5V. A person skilled in the art is aware of further realizations of receiver stages to receive data in the RFID frequency range. The charge stage realized could be the concrete one disclosed in FIG. 1 or just a general power management stage a person skilled in the art would be able to realize for such embodiment.

Figure 1:
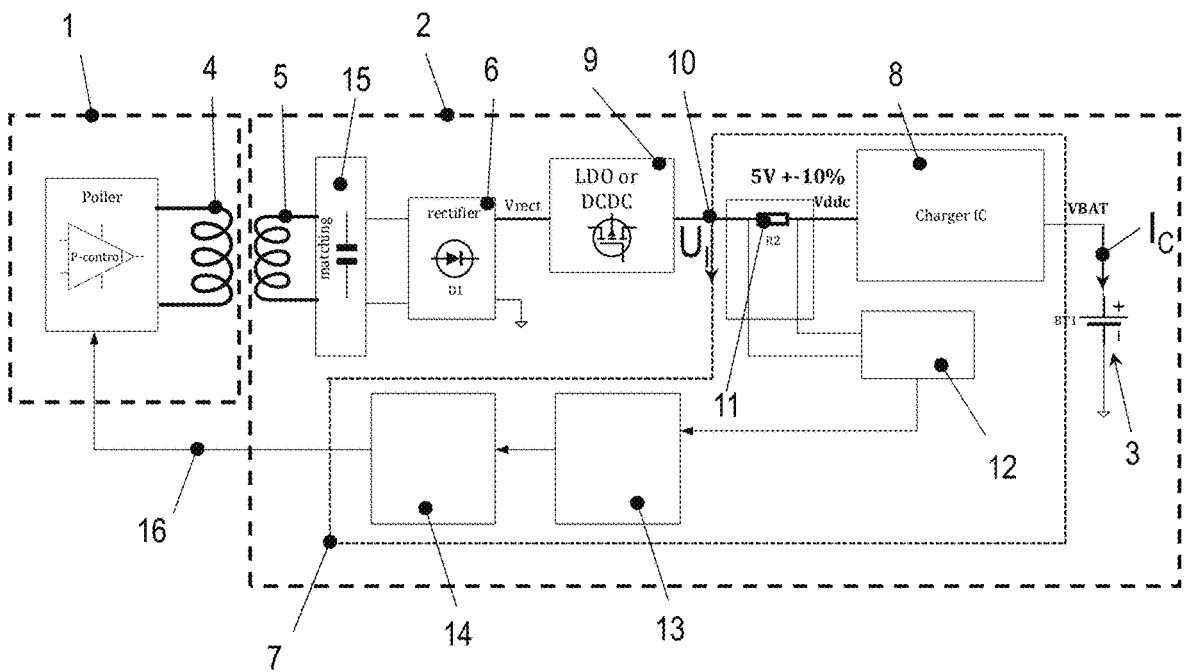
FIG. 1 shows a system known to a person skilled in the art, which system comprises a power device and a portable device with a battery to be charged wireless.

The receiver stage 23 comprises an NFC Tag 26 with a unique serial number and all what is needed to comply to the NFC protocol to communicate with the power device 18. In a preferred embodiment, the NFC Tag 26, as part of the charge stage described based on FIG. 1, provides power adjustment information to the receiver stage of the power device 18 via the wireless interface of the antennas 24 and 22 to increase or decrease the power of the magnetic field emitted by antenna 22.

The power device 18 furthermore is built to emit the magnetic field with a first waveform of the carrier signal in a power transfer mode of the power device 18 and the power device 18 and built to emit the magnetic field with a second waveform of the carrier signal in a communication mode of the power device 18 and the portable device 19. The first waveform of the carrier signal is a square-waveform with a higher energy content, than the magnetic field with the second waveform of the carrier signal, which is a sin-waveform. By using a magnetic field in the power transfer mode with higher energy content more energy or power is transferred from the power device 18 to the portable device 19 in a particular time frame. This means more energy may be harvested by the receiver stage 23 of the portable device 19, which reduces the overall charging time to load the battery 3 of the portable device 19 and which enables to load batteries with higher capacities within a reasonable time frame. All this is achieved without changing the amplitude of the carrier signal of the magnetic field. In a further preferred embodiment, both the waveform of the carrier signal and the amplitude of the carrier signal may be changed to even more increase or decrease the energy content of the magnetic field.

There are at least two substantial different possible implementations of transmitter stage 21 to enable transmitter stage 21 to provide the carrier signal to antenna 22 with different waveforms. The first of these implementations is shown in FIG. 3, which transmitter stage 21 comprises a controller stage 27 and a NFC driver stage 28, which could be realized as one stage as well. The NFC driver stage 28 generates the carrier signal of 13.56 MHz with a sin-waveform, which is used in the communication mode. A modulation stage of the NFC driver stage 28 is used to modulate data onto the carrier signal and a demodulation stage is used to demodulate data received from the portable device 19. The controller stage 27 controls the NFC driver stage 28 and the overall communication and charging protocol, as will be explained based on FIGS. 4 and 5.

The transmitter stage 21 of the power device 17 disclosed in FIG. 3 comprises the NFC driver stage 28 connected via a matching and filter stage 29 to the antenna 22. The matching and filter stage 29 comprises a matching circuit to match the impedance of the NFC driver stage 28 with the impedance of the antenna 22 for maximal power transfer. The matching and filter stage 29 furthermore comprises a multiple filter bank 45 with a first filter bank 46 with a first filter curve used in the power transfer mode to filter the generated carrier signal with the sin-waveform (second waveform) to emit the magnetic field with the square-waveform (first waveform) of the carrier signal. A person skilled in the art knows what kind of filter curve is needed to filter a square-waveform into a close to sin-waveform. In another embodiment of the invention the NFC driver stage 28 generates a square-waveform (first waveform) to be used in the power transfer mode and the NFC driver stage 28 is built to select a second filter bank 47 of the multiple filter bank with a second filter curve in the communication mode to emit the magnetic field with the sin-waveform (second waveform) of the carrier signal. In a further embodiment of the invention the NFC driver stage 28 generates another waveform of the carrier signal and transmitter stage 21 comprises a switch 48 between the NFC driver stage 28 and the matching and filter stage 29 to switch the multiple filter bank to the first filter bank to generate the square-waveform, used in the power transfer mode, and the second filter bank to generate the sin-waveform, used in the communication mode.

Figure 9:
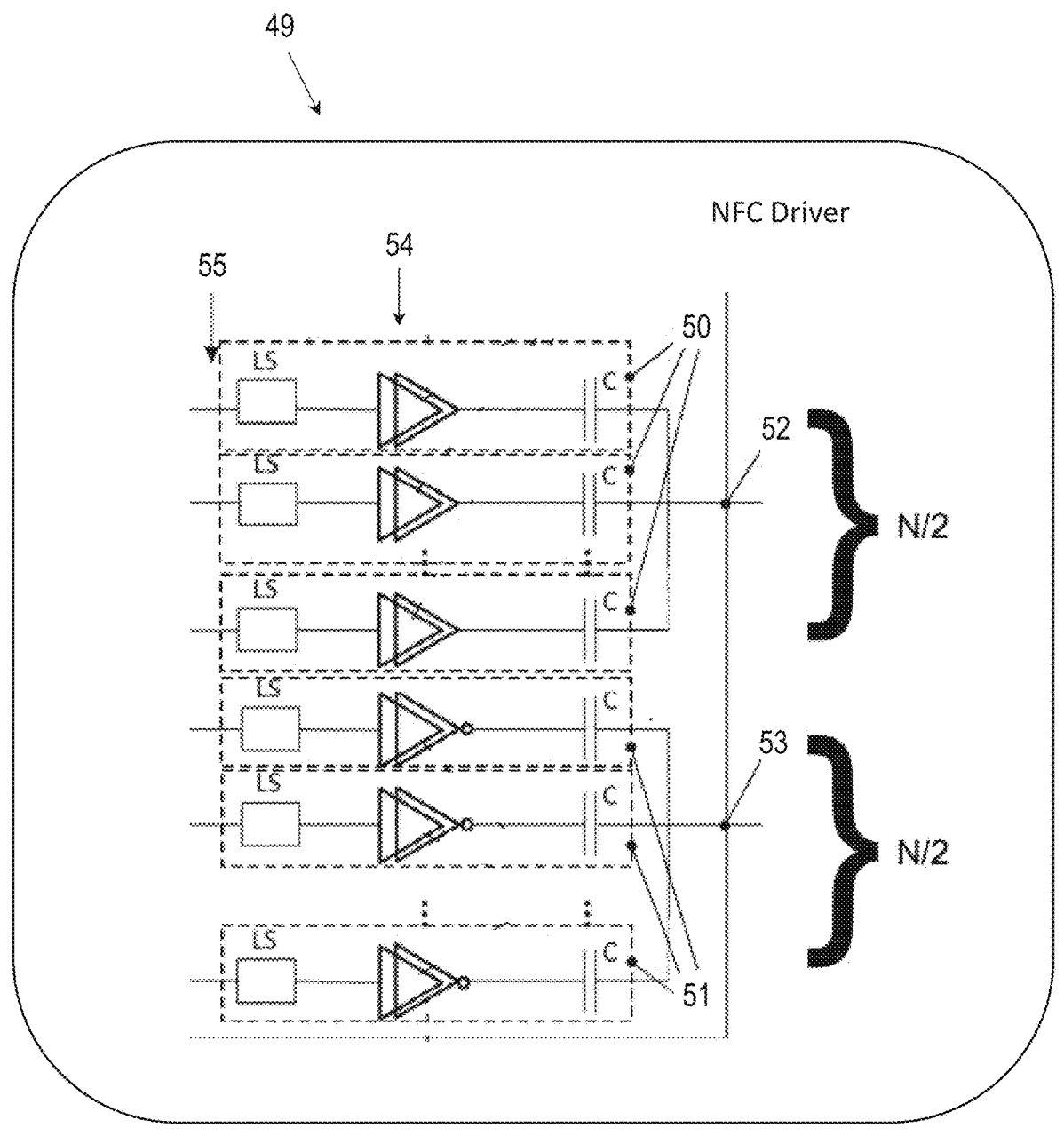
FIG. 9 shows an NFC driver stage with two parallel capacitor charge stages.

In another possible implementation of the transmitter stage 21, not shown in the figures, the NFC driver stage 49 is shown in FIG. 9 comprise two parallel capacitor charge stages 50 and 51 to generate the first waveform of the carrier signal and the second waveform of the carrier signal by adding-up different capacitor charge states for each wave of the carrier signal to generate the different waveforms. This NFC driver stage 49 is realized by a power amplifier disclosed in EP 3 182 585 B1. This known power amplifier comprises a number of N/2 driver blocks 50 connected to a first output pin 52 and further N/2 driver blocks 51 connected to a second output pin 53 of the power amplifier. Each of these parallel arranged driver blocks 50 and 51 comprises a level shifter LS and a buffer 54 or inverter and a series capacitor C, which is loaded to a charge stage depending on the waveform of the signal to be output at the first and second output pin. These parallel capacities C of all driver blocks 50 and 51 are loaded with the particular charge stage with a clock frequency M-times the carrier signal frequency of the magnetic field used for wireless charging of the battery of the portable device. The sum of these charge stages is provided at the first and second output pin and realizes the output current of the power amplifier. The use of such a power amplifier as shape stage in the transmitter stage of the power device comprises the advantage that only the bit combination at the input pins 55 of the driver blocks 50 and 51 needs to be adjusted to switch between different waveforms provided at the output pins of the driver stage 49. It is therefore easy and very energy efficient to switch between waveforms like sin-, sawtooth or rectangular. Any other waveform is possible to realize, just by changing the bit combination at the input pins 55 of the driver blocks 50 and 51.

Figure 2:
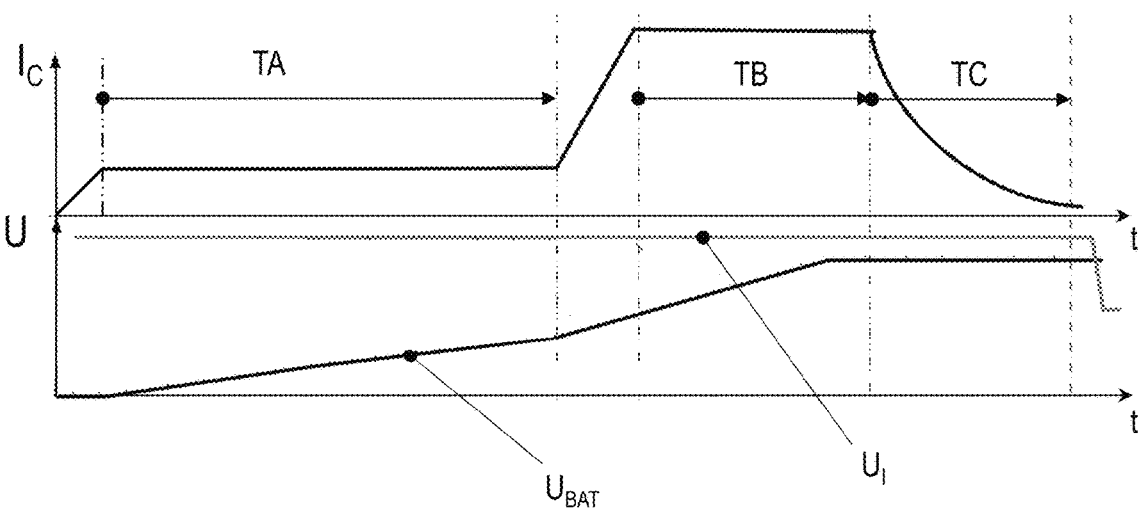
FIG. 2 shows a time diagram of the charge current to charge the battery and an input voltage of a charge stage of the portable device of the system according to FIG. 1.
Figures 4, 5:
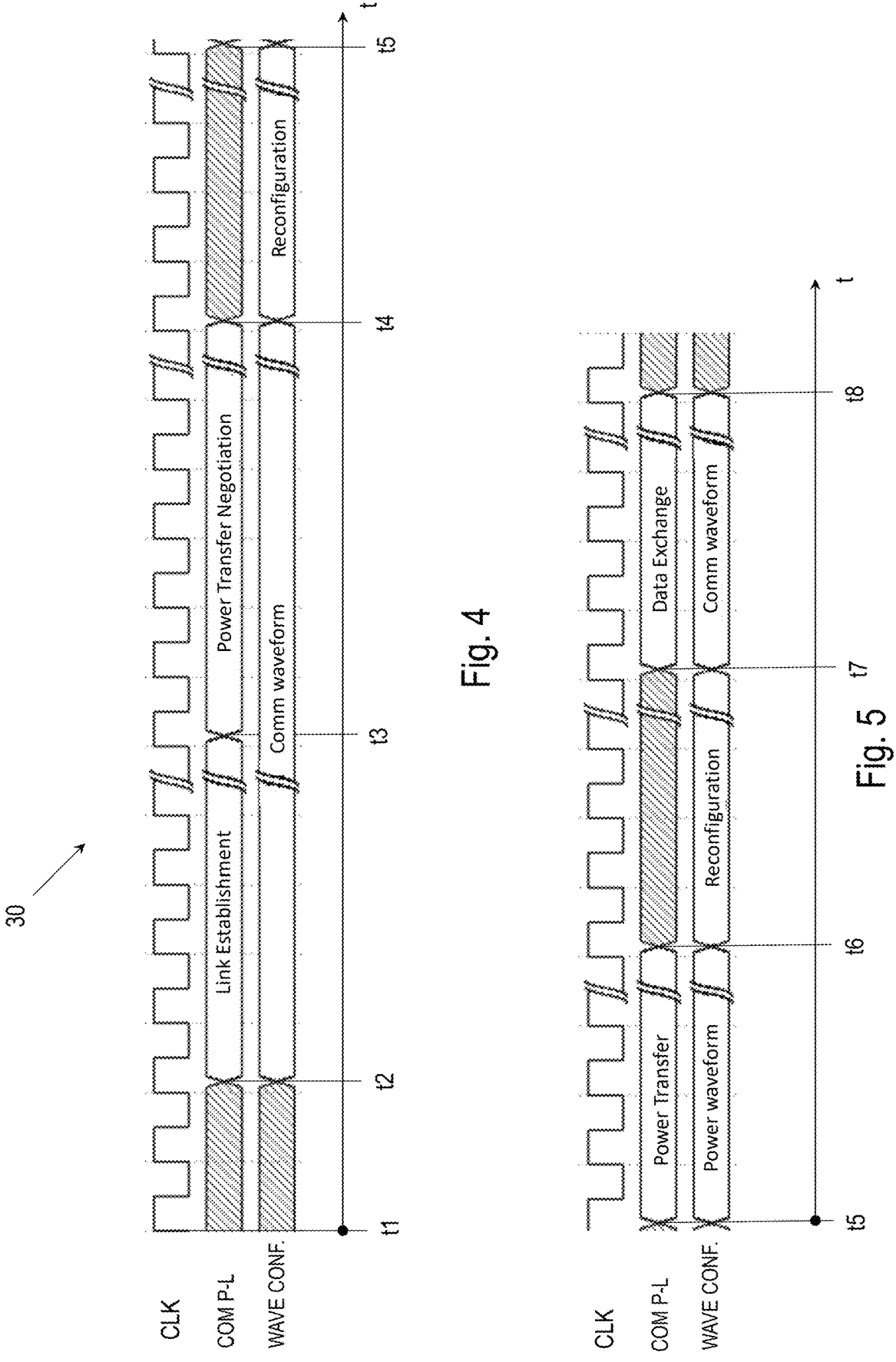
FIGS. 4 and 5 show a time diagram of relevant signals and data communicated by the system disclosed in FIG. 3.

FIGS. 4 and 5 show a communication protocol 30 between the power device 18 and the portable device 19 from a time instance t1 to t8. In the upper line the common clock signal CLK used is shown. In the middle line the communication processed between the power device 18 and the portable device 19 is shown. In the lower line the configuration of the NFC driver stage 28 to generate the waveform of the carrier signal is shown. At the first time instance t1 the power supply 20 of the power device 18 is switched on and the NFC driver stage 28 after power-up is configured to generate the carrier signal with the frequency of 13.56 MHz and a sin-waveform to enable the communication mode that starts at time instance t2. After establishing the communication link between the power device 18 and the portable device 19, which e.g. comprises a anti-collision protocol, a power transfer negotiation is processed. During this power transfer negotiation the portable device 19 may transfer data about the load status of the battery 3 and/or power adjustment information may be sent by the portable device 19. After this power transfer negotiation at time instance t4, power device 18 knows how much power needs to be transferred within the magnetic field generated by antenna 22 to enable the next step of the charging cycle as shown in FIG. 2. From time instance t4 to t5, NFC driver stage 28 switches to another filter bank to generate the square-waveform of the carrier signal to enable the transfer of high power in the magnetic field. From time instance t5 to t6 antenna 22 emits the magnetic field with the carrier signal with the square-waveform to enable charger IC of the portable device to load battery 3. The duration from time instance t5 to t6 is a fixed time duration that was negotiated during the power transfer negotiation. In another embodiment this time duration could depend on other factors as well. In the time period from time instance t6 to t7 NFC driver stage 28 switches back to the filter bank used during time instances t2 to t4 or uses the carrier signal generated by the NFC driver stage without using a filter bank to provide the sin-waveform of the carrier signal to enable the communication mode based on the NFC Standard. These time periods in the communication mode, for the next power transfer negotiation, and time periods in the power transfer mode, to transfer high power within the magnetic field, are repeated several times until all charging cycles of time periods TA, TB and TC have been processed. The same communication protocol 30 could be used between a power device and the portable device with the other possible implementation of the transmitter stage with the NFC driver stage that comprises parallel capacitor charge stages to generate the different waveforms of the carrier signal.

In another embodiment of the invention, shown dash-dotted in FIG. 3, the power device 18 comprises at least a second transmitter stage 56 with a second antenna 57 to emit a second magnetic field. It is furthermore possible that the portable device comprises a second antenna 58 exposed to the magnetic field of antenna 22 or to the second magnetic field of the power device 18 to receive a second antenna signal. A second receiver stage 59 of the portable device 19 is built to rectify the second antenna signal and to provide additional power to the load of the portable device 19. In this embodiment energy is transferred wireless from the power device 18 to the portable device 19 in a parallel way to use more antennas and magnetic fields to transfer more energy. For some or all of these magnetic fields used, the transmitter stage or the more than one transmitter stages of the power device may switch the waveform of the carrier signal to enable a communication mode and the power transfer mode.

In another embodiment of the invention, not shown in the figures, the power device is built to activate a further application mode. The transmitter stage is built to emit the magnetic field with a third waveform of the carrier signal in the further application mode, which third waveform of the carrier signal is different to the first waveform and the second waveform of the carrier signal. This third waveform could for instance be the sawtooth waveform, which transfers less power or energy compared with the sin-waveform. This minimal power transfer might be used in an energy saving mode of the power device and the portable device to stay in contact for long time like weeks or months to exchange information like the battery charge status of the battery of the portable device with minimal power used by the power device. Further applications modes with further waveforms of the carrier signal of the magnetic field emitted by the power device to the portable device may be useful as well.

Figure 6:
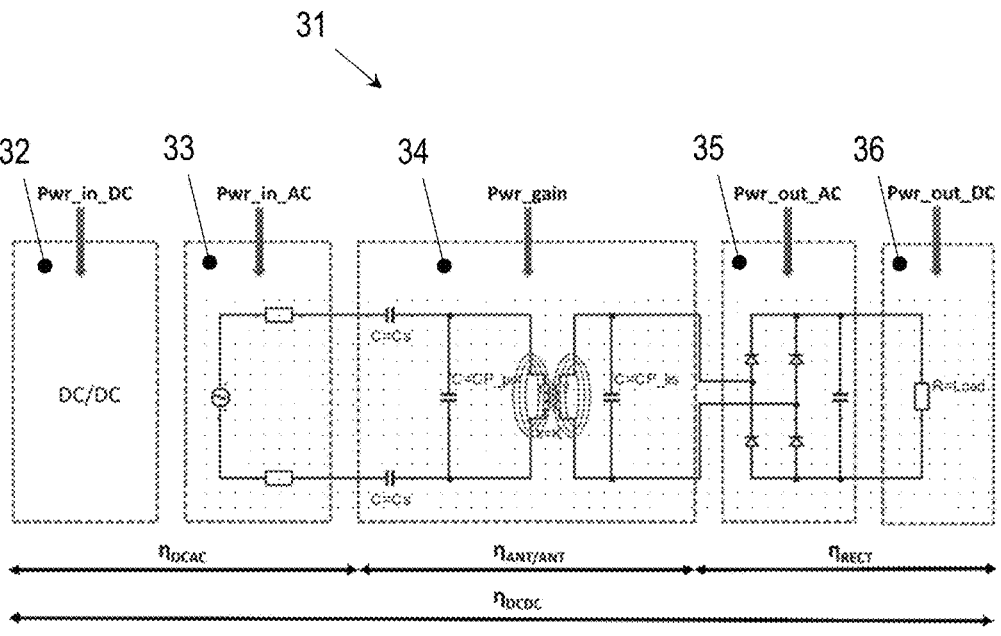
FIG. 6 shows a test circuitry to measure the power transferred wireless when using magnetic fields with a different waveform of the carrier signal.
Figure 6:

FIG. 6 shows a test circuitry 31 to measure the power transferred wireless when using magnetic fields with a different waveform of the carrier signal. A DC/DC stage 32 is connected to mains supply voltage and generates the DC voltage needed. A power source stage 33 generates a carrier signal with a particular frequency and waveform. An antenna stage 34 comprises a transmitter antenna that emits the magnetic field based on the carrier signal and a receiver antenna that is exposed to the magnetic field of the transmitter antenna and provides an antenna signal to a power receiver stage 35. This power receiver stage 35 rectifies the antenna signal and provides a DC voltage to power load stage 36.

Figure 7:
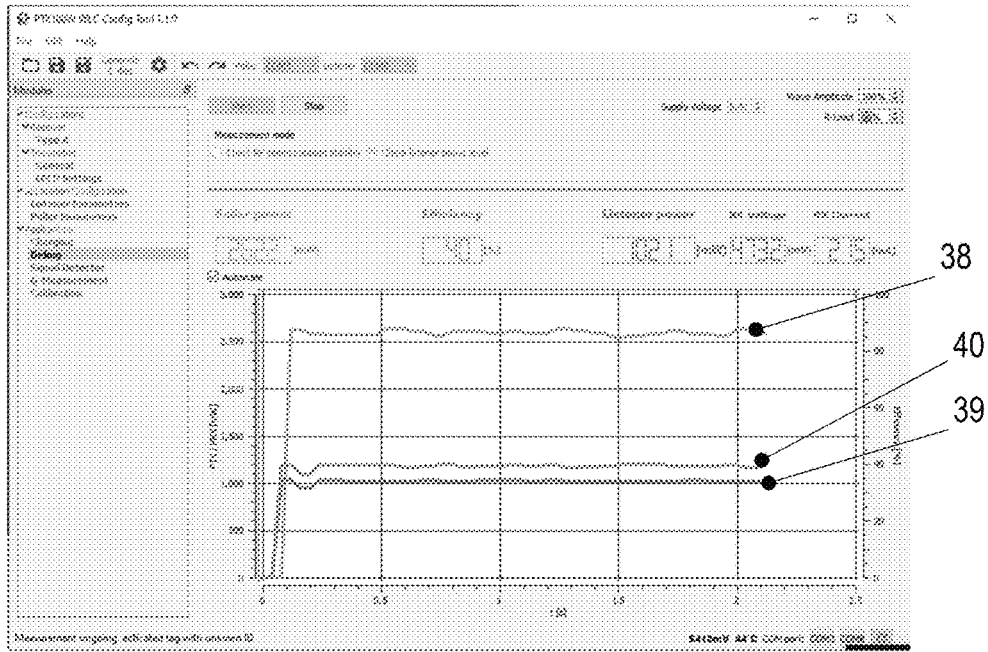
FIGS. 7 and 8 show test data measured with the test circuitry disclosed in FIG. 6.
Figure 8:
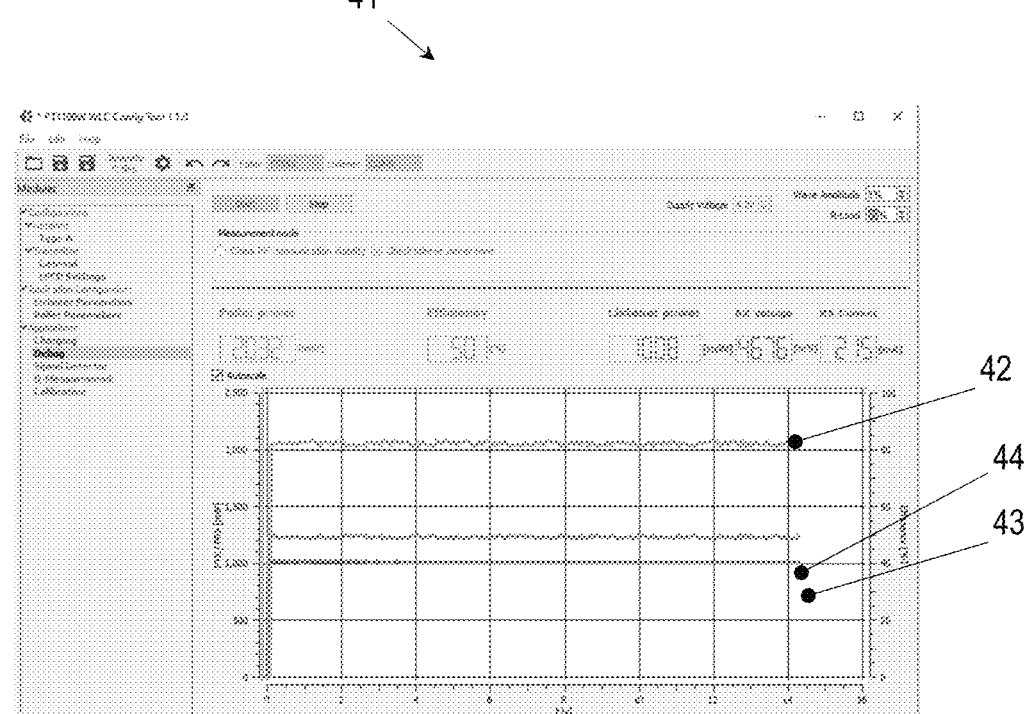

FIGS. 7 and 8 show test data measured with the test circuitry 31 disclosed in FIG. 6. FIG. 7 show test data measured for the use case when power source stage 33 generated a carrier signal with a sin-waveform. The power generated and measured in the power source stage 33 is shown as transmitter power signal 38 and the power received and measured in the power receiver stage 35 is shown as receiver power signal 39. The efficiency of this power transfer based on a sin-waveform is shown in FIG. 7 as sin-efficiency signal 40. FIG. 8 show test data measured for the use case when power source stage 33 generated a carrier signal with a square-waveform. The power generated and measured is in the power source stage 33 is shown as transmitter power signal 42 and the power received and measured in the power receiver stage 35 is shown as receiver power signal 43. The efficiency of this power transfer based on a square-waveform is shown in FIG. 8 as square-efficiency signal 44. Comparing the sin-efficiency signal 40 with the square-efficiency signal 44 a 10% improvement of the efficiency is observed what proves how useful it is to switch waveforms between a communication mode and a power transfer mode.

The invention claimed is:

1. A system comprising a power device and a portable device for wireless powering of a load of the portable device, the power device comprising:

a transmitter stage built to generate a carrier signal; and an antenna connected to the transmitter stage built to emit a magnetic field with a first waveform of the carrier signal, and the portable device comprising:

an antenna exposed to the magnetic field of the power device built to receive an antenna signal and a receiver stage connected to the antenna built to rectify the antenna signal to provide power to the load of the portable device, wherein the power device is built to emit the magnetic field with the first waveform of the carrier signal in a power transfer mode and to emit the magnetic field with a second waveform of the carrier signal in a communication mode, and wherein the power device is built to switch between the first waveform, different to a sin-waveform and comprises a larger area below a single wave than the area below a single wave of a sin-waveform, and the second waveform, which is a sin-waveform, to emit the magnetic field with the first waveform of the carrier signal with a higher energy content, than the magnetic field with the second waveform of the carrier signal, without changing an amplitude of the carrier signal of the magnetic field, wherein the transmitter stage of the power device comprises a driver stage connected via a multiple filter bank and a matching circuit of the transmitter stage to the antenna, and wherein the driver stage is built to generate a carrier signal with a fixed waveform, the driver stage is built to switch to a first filter bank with a first filter curve in the power transfer mode to filter the generated carrier signal to emit the magnetic field with the first waveform of the carrier signal, and the driver stage is built to switch to a second filter bank with a second filter curve in the communication mode to emit the magnetic field with the second waveform of the carrier signal.

2. The system according to claim 1, wherein:

the transmitter stage comprises a switch between the driver stage and the multiple filter bank; and the switch is built to switch between the first filter bank, used in the power transfer mode, and the second filter bank, used in the communication mode.

3. The system according to claim 1, wherein:

the power device comprises at least a second transmitter stage with a second antenna built to emit a second magnetic field; or the portable device comprises at least a second antenna exposed to the magnetic field or the second magnetic field of the power device built to receive a second antenna signal and a second receiver stage is built to rectify the second antenna signal and to provide additional power to the load of the portable device.

4. The system according to claim 1, wherein:

the power device is built to activate a further application mode and the transmitter stage is built to emit the magnetic field with a third waveform of the carrier signal in the further application mode; and the third waveform of the carrier signal is different to the first waveform and the second waveform of the carrier signal.

5. A system comprising a power device and a portable device for wireless powering of a load of the portable device, the power device comprising:

a transmitter stage built to generate a carrier signal; and an antenna connected to the transmitter stage built to emit a magnetic field with a first waveform of the carrier signal, and the portable device comprising:

an antenna exposed to the magnetic field of the power device built to receive an antenna signal and a receiver stage connected to the antenna built to rectify the antenna signal to provide power to the load of the portable device, wherein the power device is built to emit the magnetic field with the first waveform of the carrier signal in a power transfer mode and to emit the magnetic field with a second waveform of the carrier signal in a communication mode, wherein the power device is built to switch between the first waveform, different to a sin-waveform and comprises a larger area below a single wave than the area below a single wave of a sin-waveform, and the second waveform, which is a sin-waveform, to emit the magnetic field with the first waveform of the carrier signal with a higher energy content, than the magnetic field with the second waveform of the carrier signal, without changing an amplitude of the carrier signal of the magnetic field, wherein the transmitter stage of the power device comprises a driver stage connected via a matching circuit to the antenna of the power device, and wherein the driver stage comprises parallel capacitor charge stages built to generate the first waveform of the carrier signal and the second waveform of the carrier signal by adding-up different capacitor charge states for each wave of the carrier signal to generate the different waveforms.

* * * * *